March 22, 1955     W. L. CARROLL     2,704,411
COMBINATION FISHING POLE HOLDER AND ILLUMINATED SIGNAL
Filed April 28, 1954
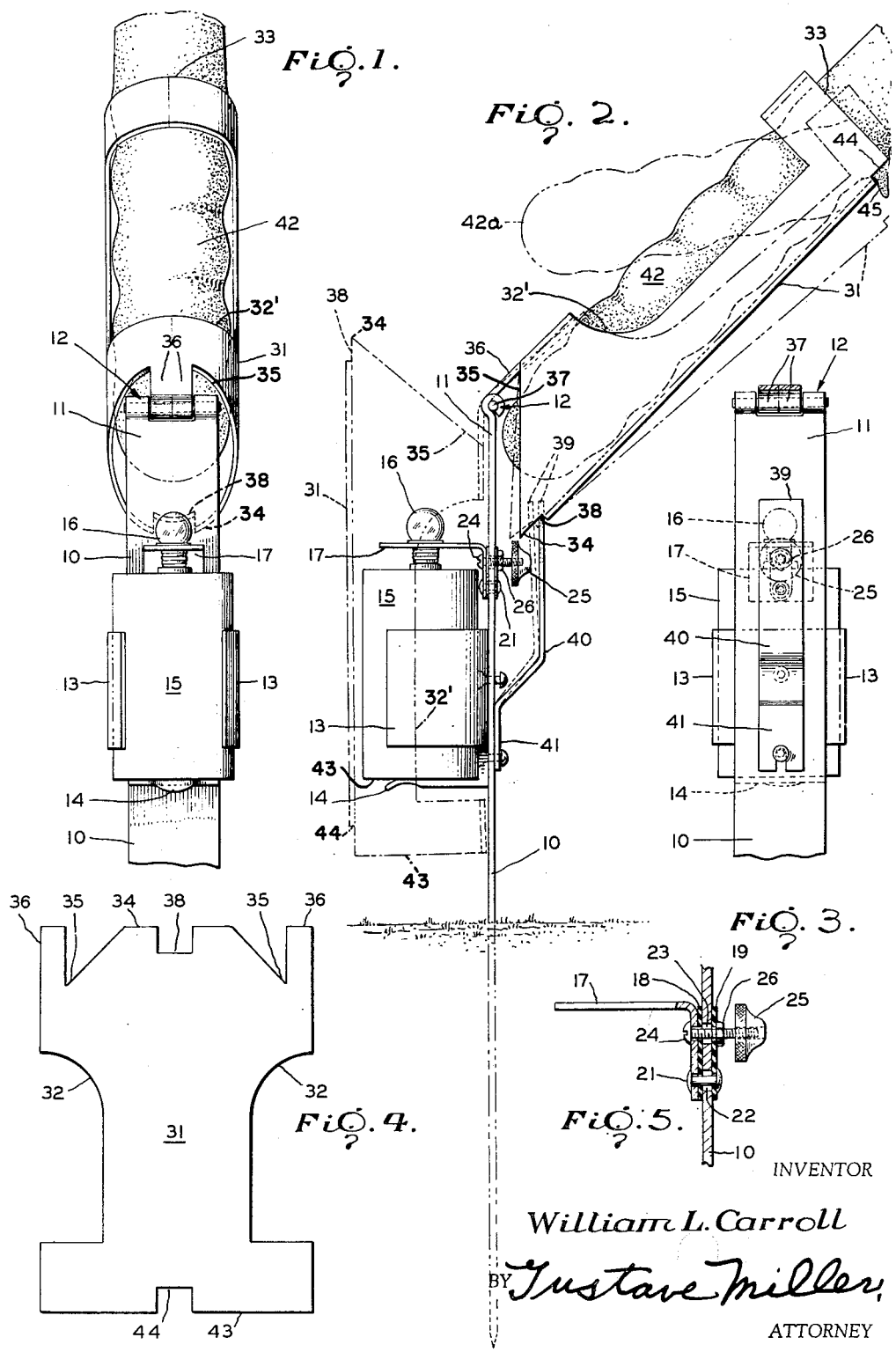

United States Patent Office 2,704,411
Patented Mar. 22, 1955

2,704,411

COMBINATION FISHING POLE HOLDER AND ILLUMINATED SIGNAL

William L. Carroll, Hastings, Nebr.

Application April 28, 1954, Serial No. 426,267

4 Claims. (Cl. 43—17)

The present invention relates generally to fishing tackle and specifically to a holder for a fishing pole which has an electric lamp signal operated by a pull on the fishline.

A principal object of the invention is to provide a holder for a fishing pole which actuates a switch to light a lamp to signal the bite of a fish.

Another object of the present invention is to provide a holder for a fishing pole which may be driven into the ground and which needs no extensive anchoring to a fishing pole handle to prevent accidental dislodging of the pole from the holder.

A further object of the invention is to provide a simple holder of few pieces which is readily assembled with only ordinary tools and sheet metal forming machinery, and one which is relatively strong with a protective cover for the lamp when in carrying condition.

A still further object of the present invention is the provision of an adjustable contact whereby the point of closing of the contact to light the lamp may be varied to accommodate different weights of fishing poles, baits, tackle, and water conditions such as tide flow, rate of river flow and the like.

These and other objects and advantages will be fully apparent upon consideration of the following description when taken in connection with the annexed drawings, in which like numerals indicate like parts throughout the several views, in which:

Fig. 1 is a front view in elevation of the present invention.

Fig. 2 is a side view in elevation of the invention showing in dotted lines the position of the holder in non-extended position.

Fig. 3 is a rear view in elevation of the stake upper end showing the details of the hinge and contact spring.

Fig. 4 is a reduced view of a developed template of the holder showing its form before forming into a cylinder.

Fig. 5 is an enlarged fragmentary section showing the contact member.

Referring to the drawing in more detail, the invention is seen to consist of a ground engaging support or stake 10 which is meant to be driven into the ground at one end and at the other end 11 it is formed with a horizontally disposed hinge 12. A pair of side clips 13 and a bottom clip 14 support a battery cell 15 having its upper terminal in contact with the base of a bulb 16 held in another clip 17 in the conventional manner and being in normally open circuit, the clip 17 being insulatably secured to the stake 10 by means of the fibre or rubber washers 18 and 19 which space a rivet 21 on each side of the stake 10 and restrain it against side movement in the oversized rivet hole 22.

A second oversized hole 23 in the stake 10 permits the screw portion 24 of the adjustable contact 25 to be threaded in the clip 17 without shorting the circuit to the lamp, and a lock nut 26 permits securing the contact after it is adjusted.

In Fig. 4 is seen a developed blank of the holder portion 31 of the invention, which is rolled into a tubular shape having both ends open and having a side partially cut away at 32 to form an opening 32' a spaced distance from one open end 33. The other end of the holder 31 is cut angularly at 35 from the front edge 34, best seen in Fig. 2 and formed with a pair of upstanding tabs 36 which are bent on themselves to form the other hinge portion 37 seen in Fig. 3. The front edge 34 is notched as indicated at 38 to straddle the free end 39 of the leaf spring 40 which is secured by its other end 41 to the stake 10. The opposite edge 43 is notched at 44 to receive a projection 45 usually present on the lower side of the rod handle 42 where it joins the offset on the upper side of which the reel is secured, thus preventing the weight of the reel from accidentally rotating the fishing rod.

It will be seen that the holder 31 swings from the non-extended position against the stake upwardly and over the stake to a position of extension less than the vertical where it is restrained from further movement downward by the leaf spring end 39 bearing against the notched front edge 34, but that any further movement of the holder 31, as by an increase in weight or pull on the line of a fishing pole which has its handle 42 in the holder as in Fig. 2 will bend the spring end 39 inwardly to make contact with the adjustable contact 25, closing the circuit and lighting the lamp.

A further feature of the holder is indicated in dotted lines in Fig. 2 at 42–a which indicates the jammed position of the fishing pole handle if it should be accidentally dislodged outward from the holder as sufficient distance for its end to rise upwardly and outwardly through the cut-away or open side 32, the end of the holder then jamming the handle end from further movement outwardly. This same open side 32 receives the clips and battery when the holder is swung closed against the stake in non-extended position, and the upper end of the holder then is a shield to protect the lamp and the whole assembly may be handled like a flashlight, with the free end of the leaf spring within convenient reach of the finger or thumb for actuation of the switch formed by the spring and the contact.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A combination fishing pole holder and illuminated signal comprising an elongated stake adapted and arranged to have one end thereof driven into the ground, a tubular body open at one end and hingedly connected at its other end to said stake, clips on said stake adapted and arranged to releasably support a flashlight battery and bulb in open circuit thereon, one of said clips being insulatably secured to said stake and having an extensible contact, a leaf spring secured to said stake by one end and having its other and free end adjacent said contact and co-acting therewith when pressed to close said circuit, said body being movable relative to said stake from one position enclosing said clips to another position of rest against said leaf spring at said free end, said body being adapted and arranged to releasably receive the handle of a fishing pole through said open end, and means for adjusting the position of said contact relative to said leaf spring whereby downward movement of said body may be made to close said circuit.

2. A combination fishing pole holder and illuminated signal comprising an elongated stake adapted and arranged to have one end thereof driven into the ground, a tubular body open at one end and hingedly connected at its other end to said stake, the top edge at the front of said body being extended beyond the point of hinge connection with said stake, said body being movable relative to said stake from a position having one side in face to face relation with said stake to a position angularly extending outward from the non-confronting face of said stake, spring means biased to support said body away from said stake in extended position, and an adjustable contact on said stake adapted and arranged to close an electric signal lamp circuit upon slight pivotal movement of said body about its hinge toward said stake while in extended position.

3. A combination fishing pole holder and illuminated signal comprising a ground engaging support, clips on said support adapted and arranged to releasably support an electric lamp and battery in normally open circuit, an elongated holder hingedly secured to said support and having an open end adapted and arranged to slidably receive the handle end of a fishing pole therein when in extended position, said holder having an open side at a spaced distance from said open end adapted to receive said clips together with a supported lamp and battery when in non-extended position on said support, means including a yieldable spring for supporting said holder in extended position above said support and at an angle to the vertical, said holder being adapted and arranged to release the end of a fishing pole handle outwardly and upwardly through said open side to jam said handle sideways in said holder when in extended position when said handle is partially dislodged from said holder, and circuit closing means for said lamp and battery including said yieldable spring on said support operable upon substantially downward angular movement of said holder, whereby said lamp is illuminated upon further angular movement of said holder from the vertical as the result of an increase in pulling movement on a fishing pole held in said holder.

4. The device defined in claim 3, the lower side of the open end of said holder being notched to cooperate with a projection on the side of the fishing pole handle opposite from the side from which the reel extends, thus preventing rotation of the fishing pole in the holder.

References Cited in the file of this patent

UNITED STATES PATENTS

| | | |
|---|---|---|
| 2,184,583 | Danko | Dec. 26, 1939 |
| 2,204,692 | Parisio | June 18, 1940 |
| 2,567,777 | Massino | Sept. 11, 1951 |

FOREIGN PATENTS

| | | |
|---|---|---|
| 463,794 | Canada | Mar. 21, 1950 |